US006978881B2

United States Patent
Brink

(10) Patent No.: US 6,978,881 B2
(45) Date of Patent: Dec. 27, 2005

(54) CONVEYOR BELT SCRAPER

(75) Inventor: Jan Louis Brink, Johannesburg (ZA)

(73) Assignee: SLIC Trading Company Limited, Belize (BZ)

( * ) Notice: Subject to any disclaimer, the term of this patent is extended or adjusted under 35 U.S.C. 154(b) by 0 days.

(21) Appl. No.: 10/498,508

(22) PCT Filed: Nov. 11, 2002

(86) PCT No.: PCT/ZA02/00173

§ 371 (c)(1),
(2), (4) Date: Jun. 21, 2004

(87) PCT Pub. No.: WO03/053823

PCT Pub. Date: Jul. 3, 2003

(65) Prior Publication Data

US 2005/0023110 A1 Feb. 3, 2005

(30) Foreign Application Priority Data

Dec. 20, 2001 (ZA) .............................. 2001/10426

(51) Int. Cl.$^7$ ........................................... B65G 45/16
(52) U.S. Cl. ..................................................... 198/499
(58) Field of Search .................................. 198/499, 497

(56) References Cited

U.S. PATENT DOCUMENTS

| 3,841,470 | A |   | 10/1974 | Meguro |   |
|---|---|---|---|---|---|
| 5,114,000 | A |   | 5/1992 | Rappen |   |
| 5,197,587 | A | * | 3/1993 | Malmberg | ................... 198/499 |
| 6,179,114 | B1 | * | 1/2001 | Brink | .......................... 198/499 |
| 6,315,105 | B1 | * | 11/2001 | Gibbs et al. | ................ 198/499 |
| 6,681,919 | B1 | * | 1/2004 | Brink | .......................... 198/499 |

FOREIGN PATENT DOCUMENTS

EP 0325748 8/1989

* cited by examiner

Primary Examiner—James R. Bidwell
(74) Attorney, Agent, or Firm—Bacon & Thomas

(57) ABSTRACT

A method of assembling a conveyor belt scraper which includes at least one scraping edge fixed to a support at least by means of a biasing member which includes the steps of prestressing the biasing member in a first sense, maintaining the biasing member prestressed, and mounting the conveyor belt scraper adjacent a surface of the belt whereby, in use, when the scraping edge exerts a scraping action on the belt and is deflected away from the belt, the biasing member is further stressed in the first sense.

8 Claims, 2 Drawing Sheets

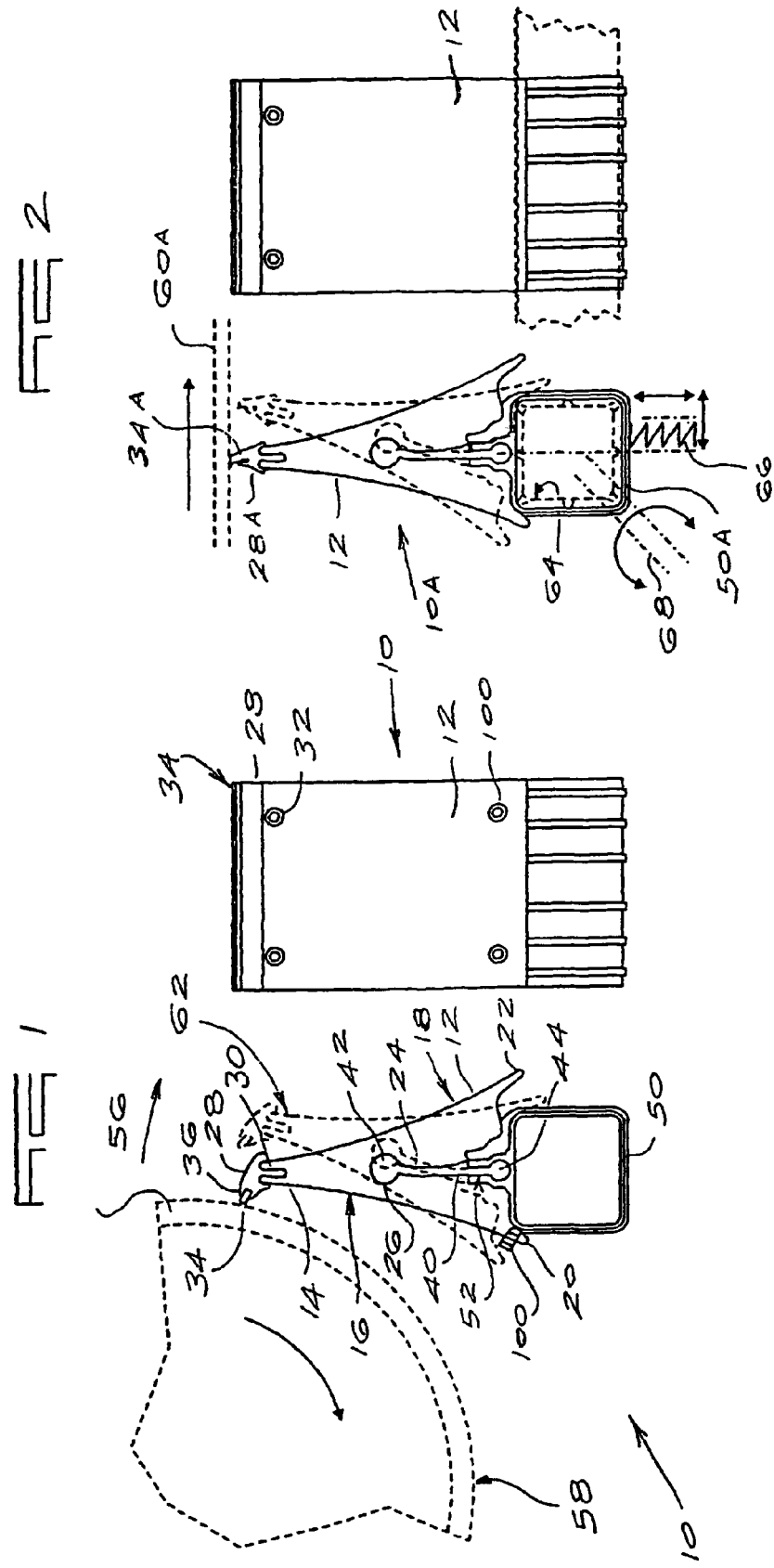

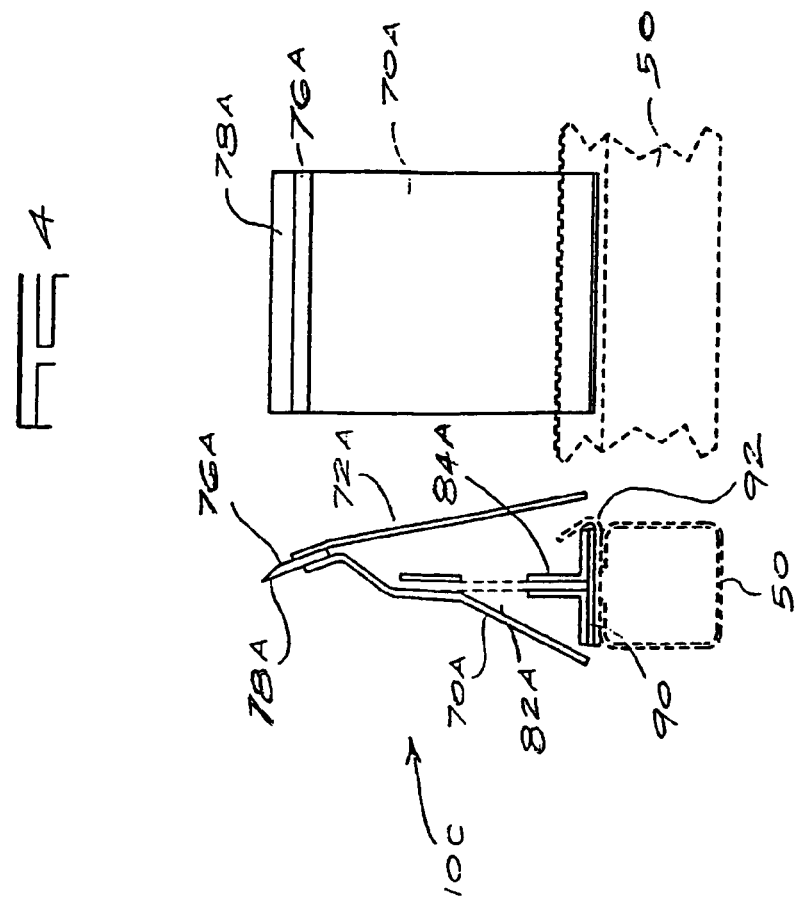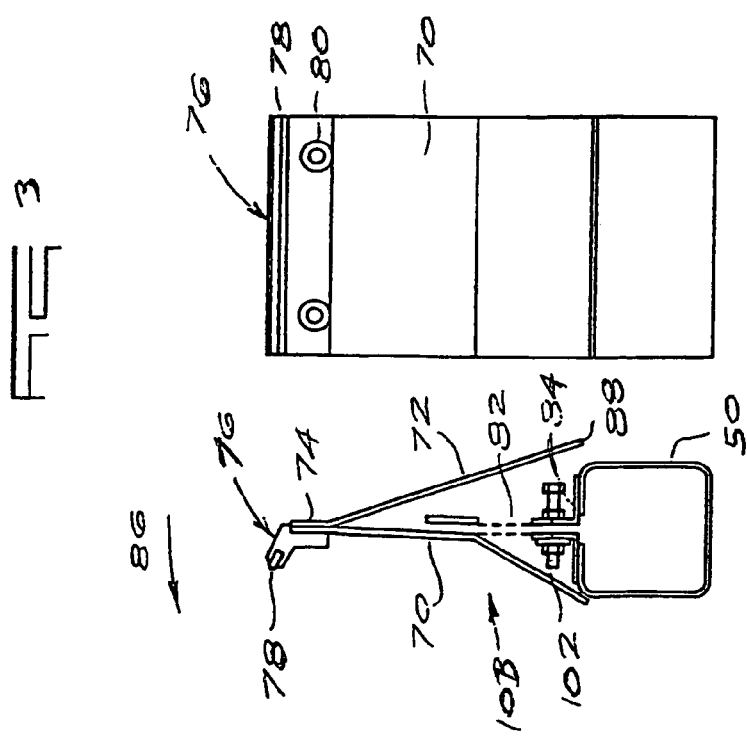

CONVEYOR BELT SCRAPER

BACKGROUND OF THE INVENTION

This invention relates generally to a conveyor belt scraper.

It is known to make use of a conveyor scraper wherein the scraping element, or each scraping element when there are a plurality of such elements, is flexible or is mounted to a spring of suitable form which allows to-and-fro movement of the scraping element, during use.

With the aforementioned type of scraper cleaning of a conveyor belt is achieved by adjusting each scraping element towards the belt surface and applying pressure so that the flexible scraping element, or the spring, as the case may be, is tensioned to remove slack and creep and to provide the necessary resistance to the moving belt so that material adhering to the belt is removed.

The pressure which is applied to flex the scraping element or tension the spring is obtained by forcing an edge of the scraping element into contact with the belt surface, with a suitable degree of force. The pressurised contact surface between the belt and the scraping edge accelerates the wear rate of the tip of the scraping edge and can increase wear on the belt surface. It is also known that the pressure exerted by the scraping element on the belt surface must be increased, as belt speed increases, in order to provide the necessary cleaning resistance.

Protrusions on the belt surface cause the scraping element to deflect away from the belt whereafter the element rebounds naturally to its original position. This action can cause additional damage to the belt surface. In certain instances the rebound results in ongoing oscillations and vibrations of the scraping element and if this movement occurs in harmony with the natural vibration frequency of the conveyor belt severe belt damage can result, an effect which is compounded as the conveyor speed increases.

Also, unrestricted movement of the scraping element can cause additional damage when the belt reverses, and when used in the primary cleaning position if a belt joint/splice opens up, or other protrusions impact on the scraper.

SUMMARY OF INVENTION

The invention provides a method of assembling a conveyor belt scraper which includes at least one scraping edge fixed to a support at least by means of a biasing member which includes the steps of:

(a) prestressing the biasing member in a first sense,
(b) maintaining the biasing member prestressed, and
(c) mounting the conveyor belt scraper adjacent a surface of the belt whereby, in use, when the scraping edge exerts a scraping action on the belt and is deflected away from the belt, the biasing member is further stressed in the first sense.

"Stress" as used herein denotes a state which is brought about by tensile, compressive or torsional force, or a combination of any of these factors, and "pre-stress" means a state of the aforementioned kind which is brought about beforehand.

The method may include the step of limiting the degree of movement of the scraper towards, and away from, the belt.

The biasing member may be prestressed in a first direction which, once the conveyor belt scraper is installed, is generally in a direction which is away from a belt surface which is to be cleaned. The biasing member is restrained from moving towards the belt surface so that the biasing member is retained in its prestressed state. Movement of the scraping edge away from the belt surface, which occurs during use, leads to the biasing member being further stressed in the first direction.

The invention may include the step of controlling the degree of prestressing in the first sense. Thus the biasing member may be prevented from being stressed beyond a predetermined level. This may be achieved in any appropriate way and for example a mechanical stop may be used which prevents the scraping edge from being moved beyond a predetermined point towards or away from the belt surface.

In step (c) the conveyor belt scraper may be mounted so that the scraping edge is in light contact with, or slightly spaced from, the belt surface which is to be cleaned.

The scraping edge may be provided on a scraper element which is fixed to the biasing member.

The invention also extends to a conveyor scraper element which includes a biasing member and a component with a scraping edge supported by the biasing member and wherein the biasing member is engageable with a support, with the scraping edge not in contact with a belt surface and with the biasing member in a prestressed state.

The biasing member may include any suitable device and may for example be a leaf spring which may be made from metal or a plastics material.

The biasing member may extend from the support and the scraping edge may be positioned remote from the support.

The biasing member may be located between two deflector surfaces. The deflector surfaces may be formed by individual components or by respective surfaces on a composite or integral component.

The biasing member may be secured to the component by means of any suitable fasteners, eg. rivets or bolts, or it may be engaged with the component by means of interengageable complementary formations on the component and the biasing member.

The biasing member may be secured to the support in any appropriate way and use may for example be made of rivets of other fasteners to secure the biasing member to the support. Again it is possible to secure the biasing member to the support by means of interengeable complementary formations on the biasing member and the support.

In one form of the invention the scraper element includes first and second deflector plates and the scraping edge component is secured to respective first ends of the plates. The biasing member is positioned between the plates and preferably is secured to one of the plates. One of the plates may abut the support, or any other structure, thereby to retain the biasing member in a prestressed condition. The extent to which the biasing member may be prestressed may be limited when the other plate is brought into contact with the support or other structure or adjustable stops for, in this way, movement of the biasing member may be controlled.

In a different form of the invention the scraper element includes a body formed from a suitable material, eg. a plastics material using an injection moulding or casting process, and respective surfaces of the body form deflectors or deflector surfaces. The biasing member is engaged with a suitable formation or formations in the body.

An additional formation on the body may be engageable with the support or any other structure to retain the biasing member in a prestressed state. Similarly a formation on the body can be brought into engagement with the support or other structure or an adjustable stop or stops thereby to control the degree of stress, whether in tensile, compressive or torsional form, which is imparted to the biasing member.

A plurality of the scraper elements may be assembled to provide a scraper assembly. This may be done using any appropriate technique and for example the scraper elements may be slidably engaged with an appropriate support structure. The scraper elements may be assembled in any appropriate configuration in an elongate array, eg. in-line, or in a staggered array.

The complete scraper assembly may be supported on adjustable or resilient mountings to accommodate normal scraper wear and to allow the passage of protrusions and joints in the conveyor belt.

BRIEF DESCRIPTION OF THE DRAWINGS

The invention is further described by way of examples with reference to the accompanying drawings each of which has two figures respectively illustrating a conveyor scraper element according to the invention from the side and from an end respectively.

In the accompanying drawings:

FIG. 1 illustrates a conveyor scraper element according to a first form of the invention mounted adjacent a belt surface which is to be cleaned and used as a primary scraper, FIG. 2 shows a conveyor scraper element which is similar to that shown in FIG. 1 but wherein the conveyor scraper element is used as a secondary scraper, FIG. 3 shows a conveyor scraper element according to a second form of the invention suitable for use as a primary scraper, and FIG. 4 illustrates a variation of the configuration shown in FIG. 3 suitable for use as a secondary scraper.

DESCRIPTION OF PREFERRED EMBODIMENTS

FIG. 1 of the accompanying drawings illustrates a conveyor scraper element 10 according to a first form of the invention from a side and from one end respectively. In this example the conveyor scraper element includes a body 12 which is moulded from a suitable plastics material, eg. reinforced nylon, and which has a roughly triangular shape in cross section. An upper end or apex of the body has an elongate groove 14 which is narrower at its mouth than at its base. Sides 16 and 18 of the body taper outwardly and downwardly from the apex and are referred to herein as deflector surfaces.

At its lower end the body has two wings or ribs 20 and 22 respectively projecting downwardly from the deflecting sides 16 and 18.

A central portion of the body is formed with a fairly substantial slot 24 which has a base 26 which is in the nature of a circular cylinder.

A scraping component 28 is mounted to the slot 14. The component 28 has a rib 30 which is of complementary shape to, and which is slideably engageable with, the slot 14. The rib is held firmly in the slot by means of rivets or other fasteners 32 which pass through holes in the upper end of the body 12 and registering holes in the rib.

A scraping edge 34 of any appropriate scraping material known in the art is mounted to a slot 36 in a projecting outer surface of the component 28.

A leaf spring 40 is engaged with the formation 24. The spring has a rounded upper end 42 which is complementary in shape to the cylindrical base 26 of the formation. At its lower end the spring has a rounded base 44 which is positioned in a gap formed at a central location in a mounting and supporting track 50.

The spring is made from a suitable material, eg. spring steel or an appropriate plastics material, with adequate corrosion resistant properties, which has an acceptable cycle life time.

The support and mounting track or rail 50 is generally in the nature of an inverted "U" to fit over square tubing and has an upper elongate slotted formation 52 which is used for mounting the scraping component. The formation 52 corresponds in shape to the lower end of the spring 40 and the base 44. It is apparent that the spring can be engaged with a sliding action with the support by sliding the base 44 into the formation 52.

The geometry of the body and the design of the support 50 are such that, in order for the body to be engaged with the support, the spring must be prestressed. In the illustrated example this is achieved by bending the body in the direction of an arrow 56 which is away from the surface 58 of a belt 60 which is to be cleaned. The spring is thereby flexed and the body can be pushed over the support with the ribs 20 and 22 extending downwardly on opposing sides of the support. Once the force which is used to bend the spring in the direction 56 is released, the spring attempts to revert to a neutral position and in so doing moves the body in a direction opposite to that indicated by the arrow 56, to a limited extent. A lower inner surface of the rib 20 is thereby brought into contact with an upper left hand corner of the support 50 and this limits the degree to which the spring can relax. The spring is thereby held in a tensioned or prestressed state.

FIG. 1 shows the scraper element 10 mounted adjacent the belt surface 58 and acting as a primary scraper. The support 50 is positioned so that the scraping edge 34 is lightly in contact with the belt surface 58. The spring is, as noted, constantly held in a biased or prestressed condition.

The degree of flexing or pivoting of the body, which is permitted, is restricted and the body can move to a limiting position, away from the belt surface, indicated by means of a dotted line 62. At this stage the rib 22 abuts an upper right hand corner of the support 50 and this limits the permitted extent of movement of the body and hence of the scraping edge 34 away from the belt surface 58. The body is allowed sufficient movement to allow the scraper blade or edge 34 to follow variations in the belt thickness or undulations in its outer surface and to deflect sufficiently to allow protrusions, which are generally encountered, to pass the scraper edge. These features have the following benefits:

(1) less applied pressure is required for the scraper element to resist the forces of the carry-back material on the belt, in order to perform its cleaning function. This reduces scraper blade and belt wear;

(2) deflection of the scraper element is limited thereby reducing rebound impact;

(3) oscillation of the scraper element is restricted thereby interrupting any vibration cycle and preventing sympathetic vibrations and resulting chatter, damage etc.;

(4) in situations where the conveyor belt is reversed over the scraper element, forward movement of the scraper element is restricted, preventing it from digging into the belt, an action which could damage the belt or the scraper element;

(5) when the scraper element is used as a primary cleaning device the restriction on forward movement reduces the possibility of the scraper element being snagged by a protrusion from the conveyor belt, a factor which could cause damage to the belt or the scraper element.

FIG. 2 illustrates a variation 10A of the arrangement shown in FIG. 1 wherein the scraper element is used as a secondary scraper. The configuration shown in FIG. 2 is not described in detail and, where applicable, components which are the same as those shown in FIG. 1 are designated with similar reference numerals.

The upper edge of the body 12 has a scraping component 28A attached to it with the element being oriented so that the scraping edge 34A extends upwardly and not to the side, as in FIG. 1. This allows the scraper element to be mounted in a vertical configuration, similar to what is shown in FIG. 1, but with the scraping edge being available for a secondary scraping action as opposed to the primary scraping action of FIG. 1.

FIG. 2 also illustrates that the support, designated 50A, can be engaged with a sliding action with a base support 64. The base support 64 is attached to fixed structure adjacent a belt 60A, at an appropriate location, and the support 50A, which is assembled with the scraping element or elements under factory conditions, is then readily engaged on-site by sliding the support 50A onto the base support 64.

FIG. 3 shows a conveyor scraper element 10B which includes a body of two metal deflector plates 70 and 72 respectively which are joined at an apex formed by upper ends 74 to which a scraping component 76 is attached. The component 76 has a scraping edge 78 of a suitable hard-wearing material fixed to it in a manner which is known in the art. The scraper element 10B is secured to the deflector plates by means of rivets or bolts 80.

The deflector plates extend downwardly and away from each other giving a generally triangular or pyramid-type construction. A leaf spring 82 of any suitable material is fixed to an inner surface of the deflector plate 70. A lower end of the spring is clamped between angle brackets 84 which are fixed to an upper surface of a support 50. A lower end of the deflector plate 70 abuts an upper left hand corner of the support 50 and retains the spring 82 in a permanently prestressed condition with the spring attempting to move to a neutral position in a direction of an arrow 86.

A lower end of the deflector plate 72, designated 88, is spaced from a right hand upper corner of the support 10. It is evident that the scraper element 10B is similar to what is shown in FIG. 1 and that if the scraping edge 78 is moved in a direction opposite to that indicated by the arrow 86 the lower end 88 of the deflector plate 72 limits the extent to which movement of the scraping edge can take place away from a belt surface which is being cleaned.

Apart from limiting the degree of movement of the spring 82 the deflector plates protect the spring and shield it, at least to some extent, from mechanical damage, and from foreign material, water and the like.

FIG. 4 illustrates a scraper element 10C which is a variation of the configuration shown in FIG. 3. The scraper element includes deflector plates 70A and 72A respectively with the plate 70A being shaped in a different form to the plate 70. A scraping component 76A, with a scraping edge 78A, is positioned between upper edges of the plate 70A and 72A and is riveted in position.

A lower end of a centrally positioned spring 82A is damped between two brackets 84A which, in turn, are attached to a base plate 90. A channel 92 with inwardly sloping side walls is fixed to an upper surface of a support 50. The base plate and the brackets can be engaged with a sliding fit with the channel 92.

Although the scraper element 10C is a variation of the arrangement shown in FIG. 3 it is evident that it is used as a secondary scraper in a manner similar to what has been described in connection with FIG. 2.

It is also to be noted, in connection with all of the embodiments of the invention, that only one scraper element has been described. It is evident that a plurality of scraper elements may be positioned in line with each other to form a longitudinally extending array of scraper elements with each scraper element being positioned above the support 50. Clearly it is possible to arrange the scraper elements in other configurations, eg. in a staggered array of two or more rows.

Another factor is that the support 50, in each embodiment of the invention, may itself be supported on a vertically and horizontally adjustable mounting 66, see FIG. 2, or it may be supported on a torsion arm 68 which allows resilient movement, or it may be mounted to shock absorbing structures or self-support mechanisms such as airbags, pneumatic or hydraulic cylinders, counterweights or torsion-type mounting assemblies.

It is also possible to modify the conveyor scraper element to adjust the degree of bias, or prestressing, which is applied to the element. For example FIG. 1 illustrates two grub screws 100 which are mounted in the body 12, bearing against the support 50, which can be adjusted to deflect the spring 40 to a greater or lesser extent, but which still act as a stop to prevent the spring from moving to a de-stressed condition.

Similarly, in FIG. 3, a screw 102 which is fixed to the spring 82 bears against an inner surface of the deflector plate 70 and can be adjusted to increase or reduce the degree to which the spring is prestressed.

What is claimed is:

1. A conveyor scraper element which includes: a body which is formed from a mouldable material; a biasing member, a component with a scraping edge supported by said biasing member; and a formation on said body, wherein said biasing member and said formation being engageable with a support, with the scraping edge not in contact with a belt surface and with said biasing member in a prestressed state.

2. A conveyor scraper element according to claim 1, wherein said biasing member includes a leaf spring.

3. A conveyor scraper element according to claim 1, wherein said biasing member is located between two deflector surfaces.

4. A conveyor scraper element according to claim 1, wherein said biasing member is secured to the support by means of interengageable complementary formations on said biasing member and the support.

5. A conveyor scraper element according to claim 1, which further includes first and second deflector plates and the scraping edge component is secured to respective first ends of the plates.

6. A conveyor scraper element according to claim 5, wherein the biasing member is positioned between the plates.

7. A conveyor scraper element according to claim 1, wherein: said body is formed with two deflector surfaces which diverge downwardly and outwardly from an apex, said component with a scraping edge being fixed to the apex, said biasing member being fixed to said body and positioned between said deflector surfaces, said biasing member including a formation whereby said body can be mounted to a support with said biasing member in the prestressed state.

8. A scraper assembly which includes a plurality of conveyor scraper elements engaged with a support structure in an elongate array, and wherein each conveyor scraper element includes: a body which is formed from a mouldable material; a biasing member; a component with a scraping edge supported by said biasing member; and a formation on said body, wherein said biasing member and said formation being engageable with a support, with the scraping edge not in contact with a belt surface and with said biasing member in a prestressed state.

* * * * *